UNITED STATES PATENT OFFICE.

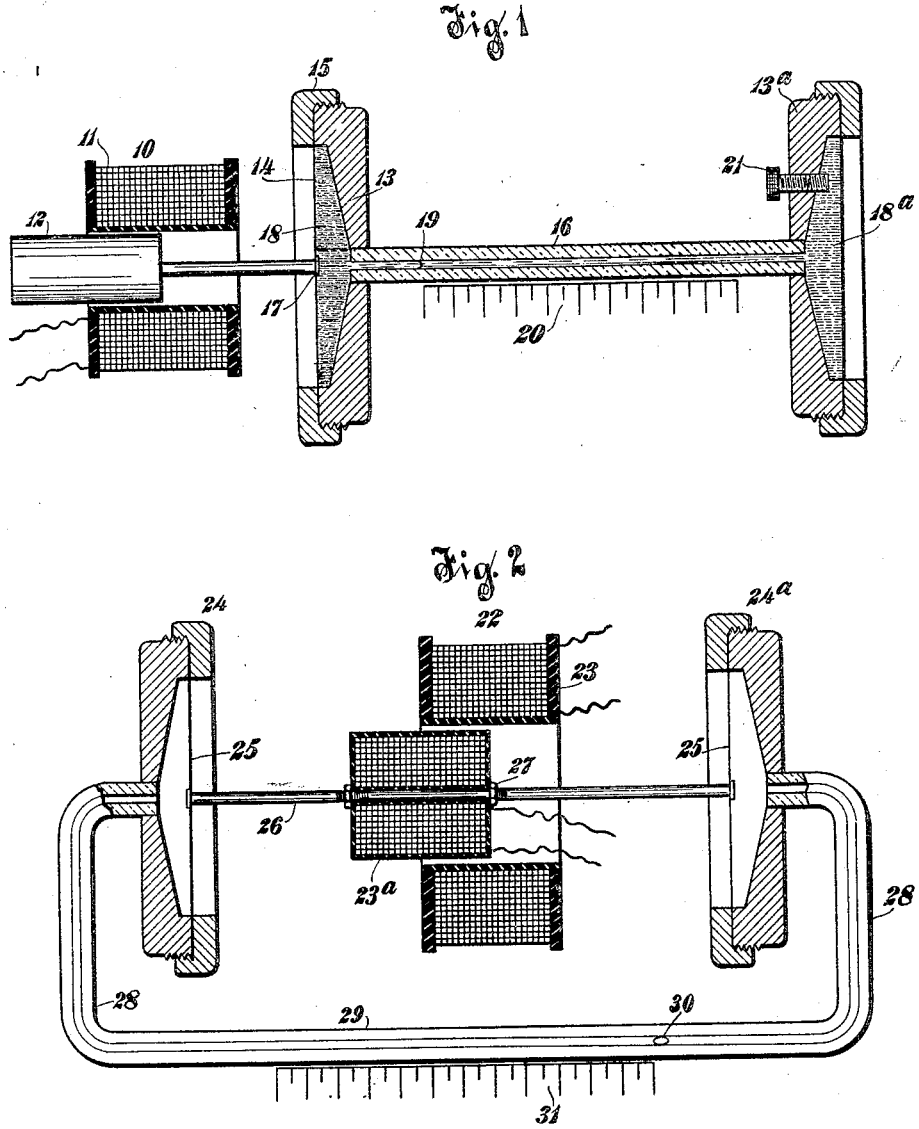

HERMON L. VAN VALKENBURG, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

MEASURING INSTRUMENT.

No. 922,362.     Specification of Letters Patent.     Patented May 18, 1909.

Application filed September 29, 1906. Serial No. 336,667.

*To all whom it may concern:*

Be it known that I, HERMON L. VAN VALKENBURG, citizen of the United States, residing at Norwood, in the county of Hamilton and State of Ohio, have invented certain new and useful Improvements in Measuring Instruments, of which the following is a full, clear, and exact specification.

My invention relates to measuring instruments.

The object of my invention is to provide an instrument which is very simple in construction, sensitive, reliable, and the indicator of which has a long range of movement with reference to a graduated scale.

In carrying out my invention I provide a measuring instrument having an indicating means comprising a pair of receptacles adapted to be filled with air or other fluid, each of which receptacles has a flexible or other yieldable diaphragm or wall and the two receptacles being connected together by a tube having a small bore such as a capillary tube so that if a movement, however small, is given to one of the diaphragms there will be a comparatively long movement of the fluid in the tube from one receptacle to the other, which movement can be measured on a suitable scale.

More specifically considered my invention consists in an electrical measuring instrument comprising an electromagnetic device having a coil and an armature or core adapted to move relatively thereto, and means for indicating relative movement of the armature or core comprising a pair of fluid filled receptacles, connected together by a tube of small bore, and each having a yieldable diaphragm, to one or both of which the movable member of the electromagnetic device is connected. The receptacle and tube may be filled with fluids of two different colors having a clear and permanent line of division which serves as an indicator, or the receptacles may be filled with air and the tube provided with an indicator such as a small globule of mercury.

My invention further consists in the combinations and arrangements of parts described in the specification and set forth in the appended claims.

For a better understanding of my invention reference is had to the accompanying drawings in which—

Figure 1 represents a sectional elevation of my improved measuring instrument; and Fig. 2 is a similar view showing a slightly modified form of my invention.

The main features of my invention may be employed in a large variety of measuring instruments, and although shown in connection with an electrical measuring instrument, I wish it understood that in its broadest aspect it is not to be confined thereto.

Referring first to Fig. 1 of the drawings, 10 represents an electromagnetic device, in this case a solenoid, consisting of a coil 11 and a movable core or armature 12. Coil 11 may be connected to an electric circuit so that volts or amperes may be measured, or if desired the movable member may be also provided with a coil as is shown in Fig. 2, so that watts may be measured. The core 12 is shown in position such that when the coil 11 is traversed by a current, the core 12 will move into the coil. I have provided novel and effective means for multiplying the movement of the core so that the value of the current traversing the coil can be measured on a long scale as will now be described. At 13 and 13$^a$ are shown two fluid receptacles, each consisting, in this case, of a cup-shaped or recessed member having on one side a yieldable wall 14, in this case, a flexible diaphragm, which is held tightly in position in some manner such as by a screw threaded cap or ring 15. The two receptacles are spaced a suitable distance apart and are arranged back to back. Connecting the two receptacles and communicating therewith is a tube 16 of small bore such as a capillary tube which is transparent, being preferably made of glass. The electromagnetic device is located adjacent to and opposite the diaphragm 14 of the receptacle 13, and the armature 12 is connected to the diaphragm as shown at 17 so that the movement of the armature core is communicated thereto. It is seen that if the receptacle and tube are filled with a fluid that even a small movement of the diaphragm causes a comparatively long movement of the fluid in the tube and if the tube is provided with an indicator the movement of the core can easily be measured. It is also seen that such an instrument is unaffected by temperature changes if the fluid in one receptacle expands and contracts the same as the other.

In this case I place in the receptacles and tube two liquids 18 and 18$^a$ of different colors, each liquid completely filling one receptacle and a portion of the tube, and having in the tube a clear line of division 19 which serves as an indicator. It is essential that the liquids in the tube do not mix or diffuse. For this reason I prefer to employ mercury as one of the liquids. At 20 is shown a graduated scale along the tube. If desired the graduations may be located on the tube. In order that the instrument may not be affected by changes in temperature it is necessary that the volumes of two liquids be so selected that one liquid will expand or contract the same amount as the other, in which case the zero position of the indicator will be fixed. Some means such as an adjustable screw 21 in one or both of the receptacles may be employed for adjusting the relative volumes of the liquids in the receptacles and tube. It is seen that when current traverses coil 11, the armature is moved from the position shown in the drawing into the coil, which movement is communicated to the diaphragm 15 and receptacle 13, forcing part of the liquid in said receptacle into the tube 16, hence moving the indicator 19 along the tube. It is seen that a long range of movement can be given to the indicator 19 by a comparatively small movement of the core 12. It is also seen that the instrument is very simple in construction and is unaffected by changes in temperature, since the expansion or contraction of one liquid is the same as the other. Furthermore the inertia of the liquid in the tube being so slight, the instrument is practically dead beat.

In the modification shown in Fig. 2, the electromagnetic device 22 consists of two coils, a stationary coil 23 and a movable coil 23$^a$. Both coils may be connected in series in the circuit, in which case the pull and relative movement are proportional to the square of the current, or of the voltage, or one of the coils may be a voltage coil and the other a current coil, so that the pull and relative movements of the coils are proportional to the watts. Two receptacles 24 and 24$^a$ similar to receptacles 13 and 13$^a$ are employed which receptacles are spaced apart and arranged with the diaphragms 25 facing each other. The movable coil 22 is mounted on a horizontally movable rod 26 and its position can be adjusted thereon by nuts 27 engaging threaded portions of the rod. The rod 26 is connected at its ends to the diaphragms 25 as is shown. Communicating with the receptacles 24 and 24$^a$ is a U-shaped capillary tube 28 having a horizontal portion 29. The receptacles and the tube may as in the first case be filled with different colored liquids, but in this case I have shown a modification, the receptacles and tube being filled with air. In the horizontal portion of the tube I provide an indicator 30 which is preferably a small globule of mercury, the movement of which can be measured on the scale 31. Thus the movement of the coil 22 is communicated to the diaphragms, moving one diaphragm inward and the other diaphragm outward, causing a movement of the air in the tube and hence a movement of the globule of mercury 30, the extent of which movement is proportional to the movement of the coil 22, and can be measured on a scale 31. The instrument here shown as in the first case is not affected by changes of temperature. If the mercury should be accidentally moved from its zero position, means may be provided for adjusting the scale or the position of the globule for each reading.

It is evident that many changes and modifications can be made without departing from the spirit and scope of my invention. I aim in my claims to cover all such modifications.

What I desire to secure by Letters Patent is:—

1. In a measuring instrument, a pair of stationary receptacles, each having a movable wall, a tube in communication with both receptacles, the receptacles and tube being fluid filled, each receptacle containing a fluid which may extend into the tube and which expands or contracts due to temperature changes the same amount as the fluid in the other receptacle, and means for applying force or pressure to at least one of said movable walls so as to cause a fluid movement in one direction throughout the length of the tube, whereby the value of said force or pressure may be measured directly by the extent of fluid movement in the tube.

2. In a measuring instrument, a pair of receptacles, a connecting member having a restricted passageway communicating with both receptacles, each of the latter having a movable wall and being filled with a fluid which extends into the tube so as to fill the same, the fluid in each receptacle being such that its changes in volume due to temperature changes are the same as the changes of the fluid in the other receptacle, and a movable member connected to at least one of said movable walls and serving when actuated to shift the corresponding movable wall so as to cause a fluid movement in one direction throughout the length of the passageway, said fluid movement in the tube being a measurable indication of the value of the force or pressure applied to the inner wall.

3. In a measuring instrument, a receptacle having a movable wall, a tube connected to the receptacle, said receptacle being filled with a fluid which normally extends a definite distance into the tube, means for shifting said movable wall so as to vary the quantity of said fluid in the tube, the extent of the fluid movement in the tube being a direct measurable indication of the value of the force or pressure applied to the movable wall, and means for preventing changes in the normal volume of said fluid in the tube due to temperature changes comprising a second receptacle having a movable wall and connected also to said tube, said second receptacle being filled with a fluid which may extend into the tube and which contracts or expands due to the temperature changes the same amount as the fluid in the first named receptacle.

4. In a measuring instrument, a pair of receptacles each having a movable wall, a connecting member having a passageway which communicates with both receptacles, a movable indicator in said passageway, the portion of the tube and the receptacle on each side of the indicator being filled with a fluid which expands or contracts due to temperature changes the same amount as a fluid on the opposite side of the indicator whereby the instrument is unaffected by changes in temperature.

5. In a measuring instrument, a pair of receptacles, each having a flexible or movable wall, a tube in communication with both receptacles, said receptacles and tube being fluid filled, the fluid in each receptacle being such that it expands and contracts due to temperature changes substantially the same amount as the fluid in the other receptacle, means for causing a shifting of the flexible or movable walls of the receptacles, said tube containing an indicator whereby the fluid movement may be measured in the tube.

6. In a measuring instrument, a pair of receptacles, each having a flexible or movable wall, a tube in communication with both receptacles, said receptacles and tube being fluid filled, the fluid in each receptacle being such that it expands and contracts due to temperature changes substantially the same amount as the fluid in the other receptacle, a movable actuating member connected to the movable wall of one of said receptacles, said tube containing an indicator whereby the fluid movement may be measured in the tube.

7. In a measuring instrument, a pair of receptacles, each having a flexible or movable wall, a tube in communication with both receptacles, said receptacles and tube being fluid filled, the fluid in each receptacle being such that it expands and contracts due to temperature changes substantially the same amount as the fluid in the other receptacle, and means whereby force or pressure may be applied to one of said movable walls thereby causing a fluid movement in the receptacles and tube, said tube containing an indicator whereby the fluid movement may be measured in the tube.

8. In an electrical measuring instrument, an electro-magnetic device including a movable member, a pair of receptacles, each having a flexible or movable wall to at least one of which the movable member is connected, a tube in communication with said receptacles, said receptacles and tube being fluid filled, the fluid in each receptacle being such that its contraction or expansion due to temperature changes substantially balances that of the fluid in the other receptacle, said tube containing an indicator whereby the fluid movement may be measured in the tube.

9. In an electrical measuring instrument, an electro-magnetic device comprising a movable member, a pair of receptacles each having a flexible diaphragm to at least one of which the movable member is connected, a tube in communication with both receptacles, said receptacles and tube being fluid filled, said tube having a movable indicator and a scale along said tube, the changes in volume of the fluid on one side of the indicator due to temperature changes being substantially the same as the changes in volume of the fluid on the opposite side of the indicator, whereby the zero position of the indicator is constant for all temperatures.

10. In a measuring instrument, an indicating device comprising a pair of receptacles, each having a movable wall, a connecting member having a restricted passageway communicating with both of said receptacles, said receptacles and connecting member being fluid filled and said member having an indicator adapted to be shifted by fluid movement in said passageway, the volume and coefficient of expansion of the fluid on each side of the indicator being such that the zero position of the indicator is substantially constant for all temperatures.

In testimony whereof I affix my signature, in the presence of two witnesses.

HERMON L. VAN VALKENBURG.

Witnesses:
ARTHUR F. KWIS,
FRED J. KINSEY.